(12) United States Patent  
Park

(10) Patent No.: US 11,228,049 B2
(45) Date of Patent: Jan. 18, 2022

(54) METHOD OF MEASURING IMPEDANCE OF FUEL CELL STACK IN VEHICLE

(71) Applicants: Hyundai Motor Company, Seoul (KR); Kia Motors Corporation, Seoul (KR)

(72) Inventor: Gun Hyung Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 16/601,123

(22) Filed: Oct. 14, 2019

(65) Prior Publication Data

US 2020/0168930 A1 May 28, 2020

(30) Foreign Application Priority Data

Nov. 23, 2018 (KR) .......................... 10-2018-0146044

(51) Int. Cl.
| | |
|---|---|
| H01M 8/04537 | (2016.01) |
| H01M 8/04858 | (2016.01) |
| H01M 10/48 | (2006.01) |
| H01M 16/00 | (2006.01) |
| H01M 8/04746 | (2016.01) |
| B60L 58/30 | (2019.01) |
| B60L 3/12 | (2006.01) |
| B60L 50/70 | (2019.01) |
| B60K 6/32 | (2007.10) |

(52) U.S. Cl.
CPC ... H01M 8/04641 (2013.01); H01M 8/04753 (2013.01); H01M 8/04873 (2013.01); H01M 8/04902 (2013.01); H01M 10/48 (2013.01); H01M 16/006 (2013.01); *B60K 6/32* (2013.01); *B60L 3/12* (2013.01); *B60L 50/70* (2019.02); *B60L 58/30* (2019.02); *B60Y 2200/91* (2013.01); *B60Y 2200/92* (2013.01); *B60Y 2400/202* (2013.01); *H01M 2220/20* (2013.01); *H01M 2250/20* (2013.01)

(58) Field of Classification Search
None
See application file for complete search history.

(56) References Cited

U.S. PATENT DOCUMENTS

2010/0279186 A1* 11/2010 Kanie ............... H01M 8/04228
429/429

* cited by examiner

*Primary Examiner* — Lucas J. O'Donnell
(74) *Attorney, Agent, or Firm* — Mintz Levin Cohn Ferris Glovsky and Popeo, P.C.; Peter F. Corless

(57) ABSTRACT

A method of measuring impedance of a fuel cell stack in a vehicle during driving of the vehicle includes: determining whether an impedance measurement of the fuel cell stack is requested during driving of the vehicle driven by power of the fuel cell stack; turning off a first relay connected between the fuel cell stack and a battery charged by the fuel cell stack when the impedance measurement of the fuel cell stack is requested; connecting a stack load to the fuel cell stack via a second relay and supplying air to the fuel cell stack; and measuring the impedance of the fuel cell stack.

15 Claims, 5 Drawing Sheets

METHOD OF MEASURING IMPEDANCE OF FUEL CELL STACK IN VEHICLE

CROSS REFERENCE TO RELATED APPLICATION

The present application claims under 35 U.S.C. § 119(a) the benefit of Korean Patent Application No. 10-2018-0146044, filed Nov. 23, 2018, the entire contents of which are incorporated by reference herein.

BACKGROUND

(a) Technical Field

The present disclosure relates to a method of measuring impedance of a fuel cell stack in a vehicle, more particularly, to the method of accurately measuring impedance of the fuel cell stack during driving of the vehicle.

(b) Description of the Related Art

Generally, impedance measurement is one of the methods of determining a state of a fuel cell stack. Physical phenomena inside the fuel cell stack can be determined by measuring impedance for each frequency band.

It is possible to evaluate ohmic loss by estimating an amount of water in the fuel cell stack in a high frequency region. In addition, it is possible to estimate characteristics of mass transfer loss in a cathode catalyst layer and a gas diffusing layer of the fuel cell in a low frequency region. Further, it is possible to evaluate activation loss including the hydrogen ion migration and electrochemical reaction characteristics in a porous catalyst layer of the fuel cell in the region between the high frequency region and the low frequency region.

Generally, impedance is measured at a steady state operating point (for example, constant current or constant voltage) of the fuel cell stack by applying a small alternating current signal to a terminal of the fuel cell stack for each frequency band and using an amplitude and phase difference of a corresponding response signal.

However, during driving of a vehicle, there is a problem in that the output of the fuel cell stack is difficult to reach a steady state at a predetermined operating point for impedance measurement, and even when the vehicle reaches a steady state, it is difficult to maintain the state.

Even when the output of the fuel cell stack reaches a steady state at a predetermined operating point, there is a problem in that it is difficult to accurately measure an impedance value of the fuel cell stack because impedance of various peripheral components connected to the fuel cell stack affects an impedance value thereof. Accordingly, the measurement accuracy of impedance of the fuel cell stack is lowered.

SUMMARY

Accordingly, the present disclosure proposes a method of measuring impedance of a fuel cell stack in a vehicle, the method capable of accurately measuring the impedance of the fuel cell stack during driving of a vehicle.

In order to achieve the above objective of the present disclosure, there is provided a method of measuring impedance of a fuel cell stack in a vehicle, the method including: determining whether an impedance measurement of the fuel cell stack is requested during driving of the vehicle driven by power of the fuel cell stack; turning off a first relay connected between the fuel cell stack and a battery charged by the fuel cell stack when the impedance measurement of the fuel cell stack is requested; connecting a stack load to the fuel cell stack via a second relay and supplying air to the fuel cell stack; and measuring the impedance of the fuel cell stack.

According to the method of the present disclosure, when the impedance measurement of the fuel cell stack is not requested, the first relay may be turned on such that an output current of the fuel cell stack is supplied to the battery through the first relay during driving of the vehicle.

In addition, according to the method of the present disclosure, when it is determined that the impedance measurement of the fuel cell stack is requested, a state of charge (SoC) of the battery may be raised to a first reference value ($\alpha$) by an output current of the fuel cell stack before turning off the first relay.

A constant flow rate of air is supplied to the fuel cell stack in connecting the stack load and supplying air to the fuel cell stack such that an output current of the fuel cell stack supplied to the stack load may have an amplitude within a predetermined range. According to the method of the present disclosure, when the amplitude of the output current of the fuel cell stack deviates from the predetermined range, the flow rate of air supplied to the fuel cell stack may be controlled such that the amplitude of the output current of the fuel cell stack is controlled to be within the predetermined range.

In measuring the impedance of the fuel cell stack, the SoC of the battery may be monitored while measuring the impedance of the fuel cell stack for each set frequency band. The impedance measurement of the fuel cell stack may be stopped when the SoC of the battery is equal to or below a second reference value that is smaller than the first reference value by a predetermined value.

According to the method of the present disclosure, the second relay may be turned off and the first relay may be turned on when the impedance measurement of the fuel cell stack is completed. In order to prevent fusing of the relays, it is preferable that the air supply to the fuel cell stack may be stopped before turning off the second relay, and a voltage applied to a terminal on battery side of the first relay is maintained at or above an output voltage of the fuel cell stack before turning on the first relay.

According to a method of measuring impedance of a fuel cell stack in a vehicle according to the present disclosure, when impedance measurement of the fuel cell stack is requested, an output current of the fuel cell stack can have an amplitude within a predetermined range determined as a steady state over a period of time. Accordingly, it is possible to measure impedance of only the fuel cell stack except the peripheral components of the fuel cell stack (stack peripheral devices), and it is possible to secure time for measuring impedances of various frequency bands.

Therefore, according to the method of measuring impedance of the present disclosure, impedance of the fuel cell stack can be accurately measured for each required frequency range.

In addition, there is provided a non-transitory computer readable medium containing program instructions executed by a processor, the computer readable medium including: program instructions that determine whether an impedance measurement of a fuel cell stack is requested during driving of a vehicle driven by power of the fuel cell stack; program instructions that turn off a first relay connected between the fuel cell stack and a battery charged by the fuel cell stack when the impedance measurement of the fuel cell stack is requested; program instructions that connect a stack load to the fuel cell stack via a second relay and supplying air to the fuel cell stack; and program instructions that measure the impedance of the fuel cell stack.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
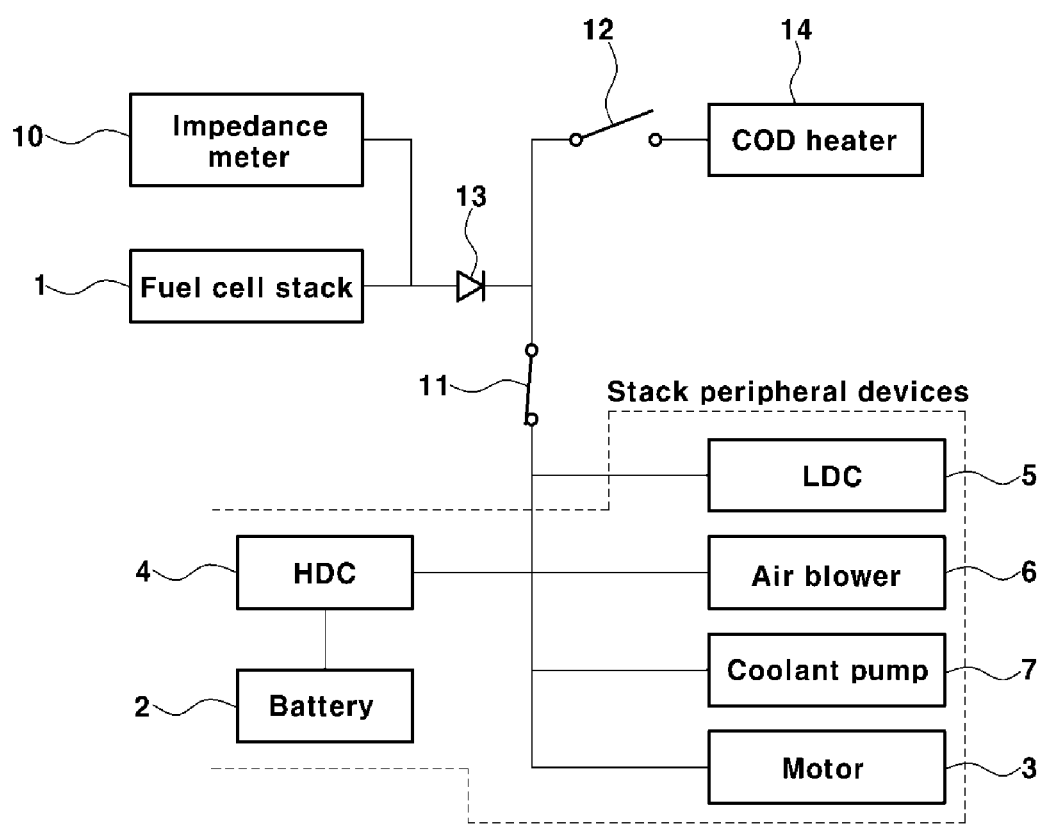
FIG. 1 illustrates a connection state of a fuel cell stack and stack peripheral devices during driving of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present disclosure will be described with reference to the accompanying drawings such that the disclosure can be easily embodied by one of ordinary skill in the art to which this disclosure belongs.

In order to measure impedance of a fuel cell stack of a vehicle, an output of the fuel cell stack is required to reach a steady state at a predetermined current or at a predetermined voltage. In other words, in order to measure impedance of the fuel cell stack provided in the vehicle, the output of the fuel cell stack is required to reach a constant current state in which the output of the fuel cell stack is maintained at a predetermined current value or a constant voltage state in which the output of the fuel cell stack is maintained at a predetermined voltage value.

As illustrated in FIG. 1, when a fuel cell stack 1 is provided in a vehicle, the fuel cell stack 1 is connected to various peripheral devices (also referred to as balance of plant (BOP)) such as: a battery 2 charged by the output current of the fuel cell stack 1; a high voltage DC-DC converter (HDC) 4 performing electric power conversion when charging and discharging of the battery 2; a low voltage DC-DC converter (LDC) 5 performing conversion of electric power supplied to an air blower 6, a coolant pump 7, or the like; a motor 3 driving a vehicle using the battery 2 as a power supply source; the air blower 6 supplying air to the fuel cell stack 1; and the coolant pump 7 supplying a coolant to the fuel cell stack 1. Therefore, it is not easy to accurately measure the impedance of the fuel cell stack 1 during driving of the vehicle.

In addition, even when an output of the fuel cell stack reaches a steady state at a predetermined current or a predetermined voltage and then impedance of the fuel cell stack is measured, the measured impedance value includes impedance of the peripheral devices such that the accuracy of measuring impedance is lowered.

Therefore, in order to accurately measure impedance of the fuel cell stack, it is necessary to measure impedance of the fuel cell stack only in a steady state in which a constant current is output from the fuel cell stack.

In addition, it is important to maintain a steady state in which a constant current is output from the fuel cell stack for a predetermined time in order to measure impedance for each frequency band because it takes a relatively long time to measure impedance of the fuel cell stack in a low frequency band.

The present disclosure discloses a method of accurately measuring impedance of the fuel cell stack 1 in a manner that the influence of the stack peripheral devices is eliminated by controlling the current of the fuel cell stack 1 to be in a steady state for a predetermined period of time by using a first relay 11, a stack load 14, a second relay 12, or the like, the first relay (or a first circuit opening/closing member) 11 being disposed between the fuel cell stack 1 and the peripheral devices of the fuel cell stack 1 (hereinafter, referred to as stack peripheral devices); the stack load 14 being operated by the fuel cell stack 1 serving as a power supply source, and the second relay 14 being disposed between the fuel cell stack 1 and the stack load 14.

A control signal (command) generated in a control process for measuring impedance of the fuel cell stack 1 may be generated from an in-vehicle controller, specifically, a fuel cell controller that is in charge of the overall control of the fuel cell system.

A method of measuring impedance of a fuel cell stack according to the present disclosure includes: determining whether an impedance measurement of the fuel cell stack 1 is requested during driving of a vehicle driven by power of the fuel cell stack 1; stopping a supply of air to the fuel cell stack 1 and turning off the first relay 11 connected between the fuel cell stack 1 and the battery 2 when the impedance measurement of the fuel cell stack 1 is requested; connecting the stack load 14 to the fuel cell stack 1 via the second relay 12 and re-supplying air to the fuel cell stack 1; and measuring impedance of the fuel cell stack 1 by an impedance meter 10 when a current having an amplitude within a predetermined range is output.

Here, each of the above steps may be controlled by the fuel cell controller.

The battery 2 is one of the stack peripheral devices. The battery 2 is charged by power generated and output from the fuel cell stack 1 and supplies a drive current to the motor 3 via the HDC 4, which is a first power conversion device. The motor 3 is driven by electric power of the battery 2 supplied through the first power conversion device 4 such that a vehicle is driven by a driving force generated by the motor 3.

Figure 5:
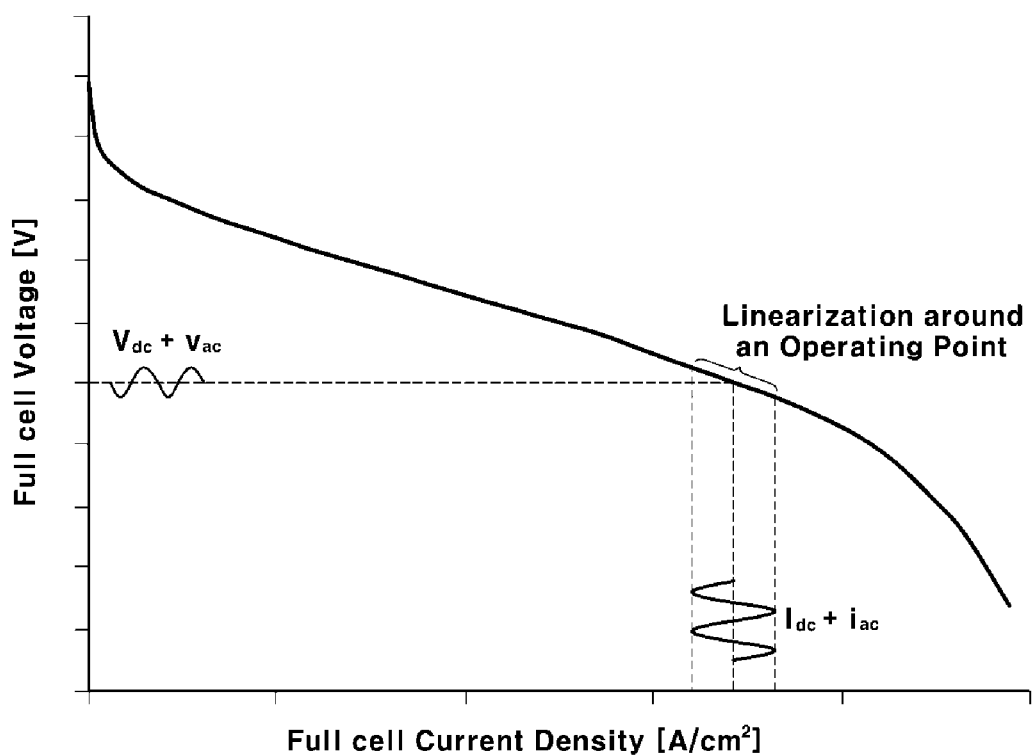
FIG. 5 illustrates an operating point for accurately measuring impedance of the fuel cell stack.

The impedance meter 10 is connected to an output terminal of the fuel cell stack 1 and measures impedance of the fuel cell stack 1 under a predetermined operating condition (see FIG. 5) in which an output current or an output voltage of the fuel cell stack 1 is maintained in a constant current or a constant voltage state.

The fuel cell stack 1 is supplied with fuel (hydrogen and air) through the fuel cell system to generate electricity for charging the battery 2 or for other functions. The output terminal of the fuel cell stack 1 may be provided with a diode 13 preventing current from flowing from the stack peripheral devices to the fuel cell stack 1. The diode 13 prevents a current flowing between the fuel cell stack 1 and the first relay 11 through the first relay 11 from flowing to the fuel cell stack 1.

The first relay 11 is provided between the fuel cell stack 1 and the stack peripheral devices including the battery 2 and the motor 3. The first relay 11 serves to open and close a circuit connected between the stack peripheral devices and the fuel cell stack 1. The fuel cell controller controls on/off operations of the first relay 11. When the first relay 11 is turned off, the supply of the current flowing from the fuel cell stack 1 to the stack peripheral devices is stopped (see FIG. 2).

The second relay 12 is provided between the fuel cell stack 1 and the stack load 14 and functions to open and close a circuit connected between the fuel cell stack 1 and the stack load 14. The fuel cell controller controls on/off operations of the second relay 12. When the second relay 12 is turned on, the output current of the fuel cell stack 1 is supplied to the stack load 14. At this point, the output current of the fuel cell stack 1 is directly supplied to the stack load 14 without conversion.

Here, the stack load 14 may be provided as a cathode oxygen depletion (COD) heater having a function of rapidly heating a coolant supplied to the fuel cell stack when cold-starting a vehicle and a function of removing remaining oxygen in the fuel cell stack when starting or shutting down a vehicle. However, the stack load 14 may not be provided as a COD heater. Any other component may be used as the stack load 14, provided that the component can maintain steady state output current and output voltage in the fuel cell stack 1.

Figure 3:
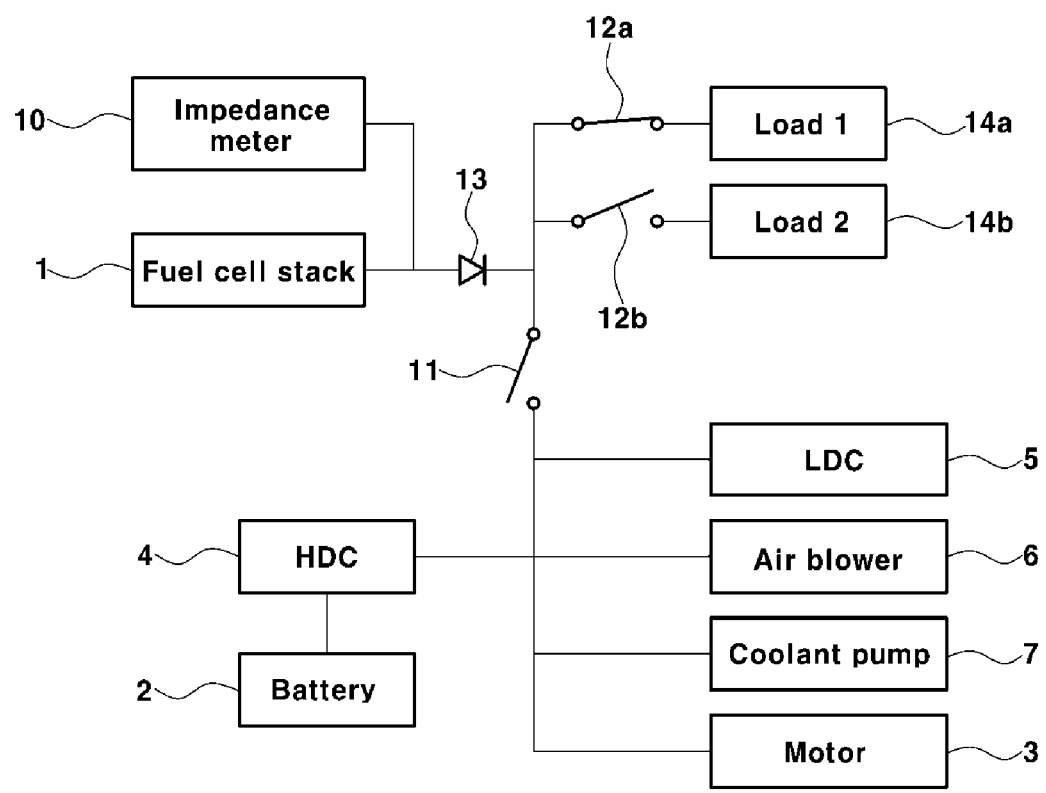
FIG. 3 illustrates a state in which multiple loads are individually connected to the fuel cell stack using different relays.

In addition, the stack load 14 may be composed of multiple loads connected in parallel. The multiple loads may be electrically connected to the fuel cell stack 1 through different relays (i.e., circuit opening/closing members) in a selective manner. Specifically, as illustrated in FIG. 3, the stack load 14 may be composed of a first load 14*a* and a second load 14*b* that are connected in parallel. The first load 14*a* may be connected to or disconnected from the fuel cell stack 1 via a second-first relay 12*a*, and the second load 14*b* may be connected to or disconnected from the fuel cell stack 1 via a second-second relay 12*b*. That is, the first load 14*a* and the second load 14*b* may be individually connected to the fuel cell stack 1 through the second-first relay 12*a* and the second-second relay 12*b*.

As described above, it is possible to drive the multiple loads 14*a* and 14*b*, which are connected to the fuel cell stack 1 using a device such as a relay such that the load of the fuel cell stack 1 is controlled, and thus impedance of the fuel cell stack 1 can be measured in various current ranges.

In addition, when driving the vehicle, the first relay 11 is turned on to supply the power of the fuel cell stack 1 to the battery 2 through the first relay 11 (see FIG. 1). When the first relay 11 is turned on, the circuit connected between the fuel cell stack 1 and the battery 2 is closed such that the output current of the fuel cell stack 1 flows through the first power conversion device 4 and thus the battery 2 is charged.

Hereinafter, a process for measuring impedance of the fuel cell stack according to the present disclosure will be described with reference to FIG. 4.

Figure 4:
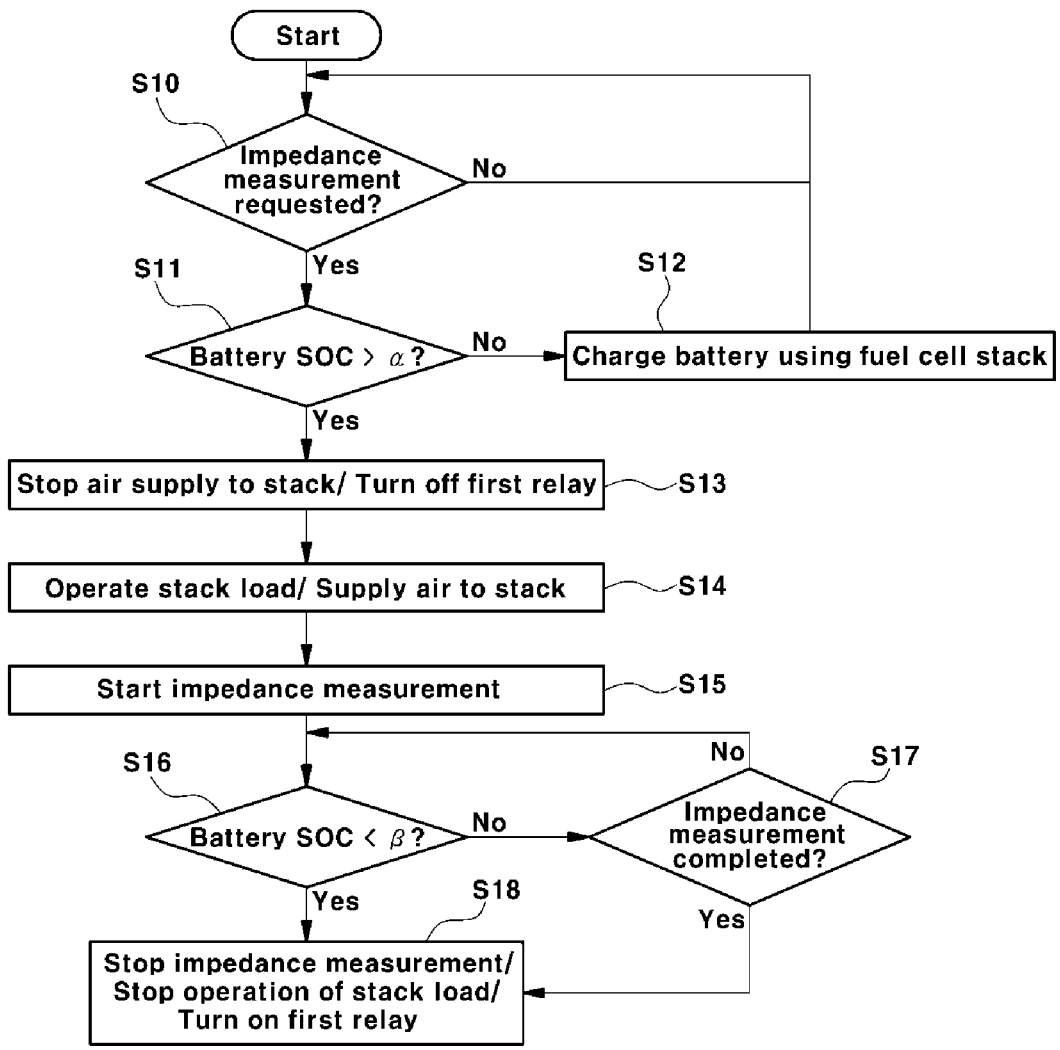
FIG. 4 illustrates a control process for measuring impedance of the fuel cell stack.

As illustrated in FIG. 4, it is determined whether the impedance measurement of the fuel cell stack 1 is requested during driving of the vehicle (S10). The impedance measurement request may be generated from the impedance meter 10, and the occurrence of the request may be determined by the fuel cell controller.

When it is determined that the impedance measurement request is generated, a state of charge (SoC) of the battery 2 is compared with a set first reference value ($\alpha$) (S11). When the SoC of the battery 2 is below the first reference value ($\alpha$), the SOC of the battery 2 is monitored while charging the battery 2. The charging of the battery 2 is continued until the SoC of the battery 2 reaches the first reference value ($\alpha$) (S12). That is, when the impedance measurement of the fuel cell stack 1 is requested, the impedance measurement is preceded by increasing the SoC of the battery 2 to the first reference value ($\alpha$).

Figure 2:
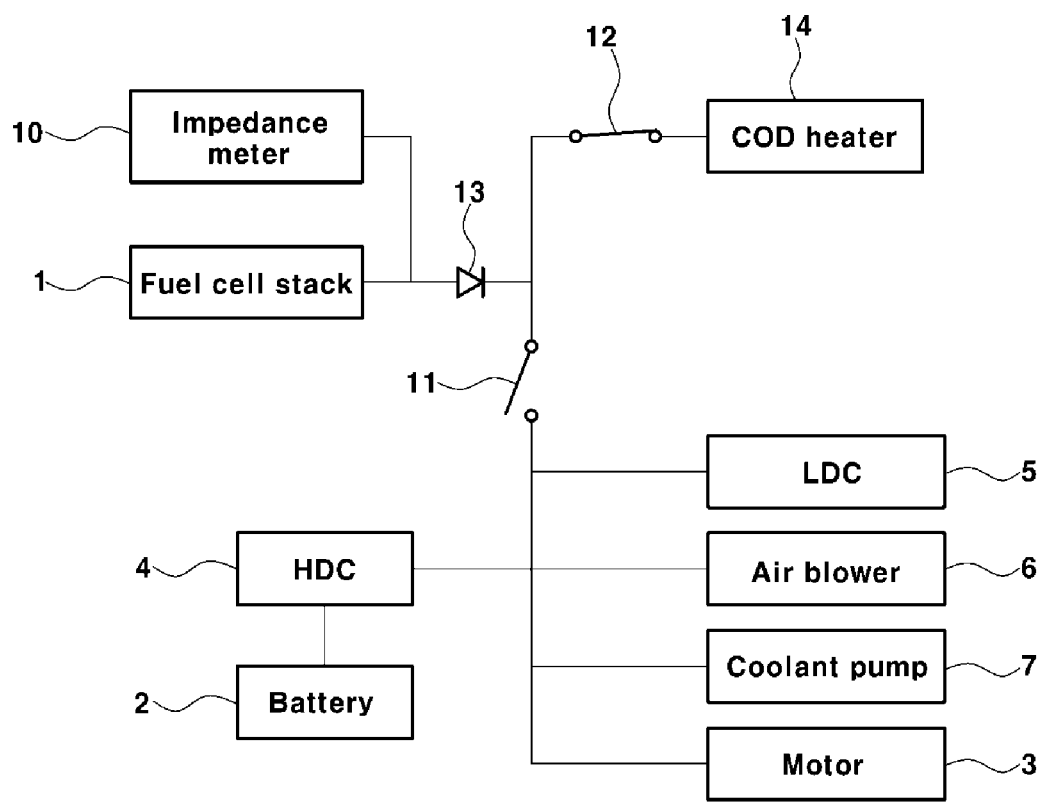
FIG. 2 illustrates a disconnected state of the fuel cell stack and the stack peripheral devices during impedance measurement.

When the first relay 11 is turned off during driving of the vehicle, the stack peripheral devices including the motor 3 is required to be driven only by the remaining SoC of the battery 2 (see FIG. 2). Therefore, it is required to charge the battery 2 before the first relay 11 is turned off to secure the SoC of the battery 2 to the first reference value ($\alpha$). The charging of the battery 2 may be performed by the fuel cell controller. The first reference value ($\alpha$) may be set to a value required for driving the stack peripheral devices including the motor 3 without need for additional charging of the battery 2 until the impedance measurement is completed.

After the SoC of the battery 2 reaches the first reference value ($\alpha$), it is determined again whether the impedance measurement of the fuel cell stack 1 is requested. When the impedance measurement of the fuel cell stack 1 is still being requested, the first relay 11 is turned off by a command of the fuel cell controller (S13).

The air supply to the fuel cell stack 1 by the fuel cell controller may be stopped before the first relay 11 is turned off in order to prevent fusing of the first relay 11 (S13).

In order to prevent fusing of the first relay 11, before turning off the first relay 11, it is preferable that the voltage of the fuel cell stack 1 is lowered than the voltage of an output terminal on battery side of the first relay 11. Specifically, in order to prevent a voltage difference between the terminal on the fuel cell stack side of the first relay 11 and the terminal on the battery side of the first relay 11, it is preferable that the voltage applied to the terminal on the fuel cell stack side of the first relay 11 is lowered to be equal to or below the voltage applied to the terminal on the battery side of the first relay 11 and then the first relay 11 is turned off. By preventing the voltage difference, it is possible to prevent the current from inadvertently flowing to the first relay 11. After the first relay 11 is turned off, the voltage applied to the terminal on the fuel cell stack side can be raised.

After the first relay 11 is turned off, the stack load 14 is electrically connected to the fuel cell stack 1 through the second relay 12, and air is supplied to the fuel cell stack 1 (S14). When the second relay 12 is turned on, the current of the fuel cell stack 1 is supplied to the stack load 14 such that the stack load 14 is driven. The fuel cell stack 1 may be supplied with a constant flow rate of air to generate electricity. As the constant flow rate of air is supplied, the fuel cell stack 1 outputs a steady state current. That is, as the constant flow rate of air is supplied to the fuel cell stack 1, the fuel cell stack 1 outputs a current determined as a steady state.

A constant flow rate of hydrogen comes with the constant flow rate of air supplied to the fuel cell stack 1. At this point, the fuel cell stack 1 outputs a small alternating current (Idc+iac) having a small amplitude (see FIG. 5), and the small alternating current has a small amplitude within a predetermined range determined as a steady state.

When an amplitude of the output current of the fuel cell stack 1 deviates from the predetermined range determined as a steady state, it is difficult to accurately measure impedance of the fuel cell stack 1.

Thus, after starting the air supply to the fuel cell stack 1, the output current of the fuel cell stack 1 is monitored. When the amplitude of the output current is detected to be out of the predetermined range, the amount of air supplied to the fuel cell stack 1 is controlled to limit the amplitude of the output current to be within the predetermined range. As the fuel cell controller controls the air supply amount and the hydrogen supply amount, the amount of air supplied to the fuel cell stack 1 is controlled.

When the fuel cell stack 1 starts to generate electricity by using the supplied constant flow rate of air, the impedance measurement of the fuel cell stack 1 is started on the basis of the output current of the fuel cell stack 1 (S15). Here, the impedance of the fuel cell stack 1 is measured for each set frequency band, and each frequency band in which the impedance measurement of the fuel cell stack 1 is required may be preset and stored in the fuel cell controller.

The vehicle is operated even while the impedance of the fuel cell stack 1 is being measured, whereby the SoC of the battery 2 is gradually reduced. Accordingly, in order to check the SoC of the battery 2, the SoC of the battery 2 is monitored in real time by the fuel cell controller while measuring the impedance of the fuel cell stack 1. Specifically, during the measurement of the impedance of the fuel cell stack 1, the SoC of the battery 2 is continuously and repeatedly compared with a second reference value ($\beta$) (S16). When the SoC of the battery 2 is below the second reference value ($\beta$), the operation of measuring the impedance of the fuel cell stack 1 (i.e., the operation of the impedance meter) is immediately stopped.

The second reference value ($\beta$) may be set to a value smaller than the first reference value ($\alpha$) by a predetermined value or more and stored in the fuel cell controller. In addition, a predetermined value determining that driving stability of the vehicle is decreased may be used as the second reference value ($\beta$).

When the impedance measurement of the fuel cell stack 1 is stopped or completed (S17), the operation of the stack load 14 is stopped and the first relay is turned on (S18). The second relay 12 may be turned off to stop the operation of the stack load 14.

In order to prevent fusing of the relays when switching the operating state of the first relay 11 and the second relay 12, it is preferable that voltage applied to the terminal on the battery side is maintained at or above the output voltage of the fuel cell stack before turning on the first relay 11, and it is preferable that the air supply to the fuel cell stack 1 is stopped before turning off the second relay 12. The voltage applied to the terminal on the battery side of the first relay 11 may be maintained at or above the output voltage of the fuel cell stack 1 before state change of the first relay 11 to the on state is completed. The second relay 12 may be temporarily turned off before state change of the second relay 12 to the off state is completed.

Before the first relay 11 is switched to the on state, the voltage value of the terminal on the battery side of the first relay 11 is maintained at or above the output voltage value of the fuel cell stack 1 such that it is possible to prevent current from inadvertently flowing to the first relay 11.

As described above, in the case of measuring impedance of the fuel cell stack, the vehicle is driven only by the power of the battery while the impedance of the fuel cell stack is measured. In addition, the output current of the fuel cell stack is maintained at a constant amplitude in a steady state by using the stack load while the connection between the fuel cell stack and the stack peripheral devices is released. By measuring the impedance during the operation of the fuel cell stack, the impedance of only the fuel cell stack can be accurately measured without being affected by the stack peripheral devices or the like.

Further, since the fuel cell stack outputs a steady state current for a predetermined time, a time for measuring impedance in various frequency ranges is secured.

Although the embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of measuring impedance of a fuel cell stack in a vehicle, the method comprising:
   determining, by a controller, whether an impedance measurement of the fuel cell stack is requested during driving of the vehicle driven by power of the fuel cell stack;
   turning off, by the controller, a first relay connected between the fuel cell stack and a battery charged by the fuel cell stack when the impedance measurement of the fuel cell stack is requested;
   connecting, by the controller, a stack load to the fuel cell stack via a second relay and supplying air to the fuel cell stack; and measuring, by the controller, the impedance of the fuel cell stack.

2. The method of claim 1, wherein, when the impedance measurement of the fuel cell stack is not requested, the first relay is turned on such that an output current of the fuel cell stack is supplied to the battery through the first relay during driving of the vehicle.

3. The method of claim 1, wherein, when the impedance measurement of the fuel cell stack is requested, a state of charge (SoC) of the battery is raised to a first reference value by an output current of the fuel cell stack before turning off the first relay.

4. The method of claim 1, wherein, in turning off the first relay, the air supply to the fuel cell stack is stopped before turning off the first relay.

5. The method of claim 1, wherein, in turning off the first relay, a voltage of the fuel cell stack is lowered to a voltage lower than a voltage of a terminal on a battery side of the first relay before turning off the first relay.

6. The method of claim 1, wherein a constant flow rate of air is supplied to the fuel cell stack in connecting the stack load and supplying air to the fuel cell stack such that an output current of the fuel cell stack supplied to the stack load has an amplitude within a predetermined range.

7. The method of claim 6, wherein, when the amplitude of the output current of the fuel cell stack deviates from the predetermined range, the flow rate of air supplied to the fuel cell stack is controlled such that the amplitude of the output current of the fuel cell stack is controlled to be within the predetermined range.

8. The method of claim 3, wherein, in measuring the impedance of the fuel cell stack, the SoC of the battery is monitored while measuring the impedance of the fuel cell stack for each set frequency band.

9. The method of claim 8, wherein the impedance measurement of the fuel cell stack is stopped when the SoC of the battery is less than or equal to a second reference value that is smaller than the first reference value by a predetermined value.

10. The method of claim 1, wherein the second relay is turned off and the first relay is turned on when the impedance measurement of the fuel cell stack is completed.

11. The method of claim 10, wherein the air supply to the fuel cell stack is stopped before turning off the second relay.

12. The method of claim 10, wherein a voltage applied to a terminal on a battery side of the first relay is maintained at or above an output voltage of the fuel cell stack before turning on the first relay.

13. The method of claim 1, wherein the stack load is composed of multiple loads connected in parallel, and the multiple loads are selectively connected to the fuel cell stack through different relays.

14. The method of claim 1, wherein a diode is provided between the fuel cell stack and the first relay to prevent current from flowing to the fuel cell stack.

15. A non-transitory computer readable medium containing program instructions executed by a processor, the computer readable medium comprising:
   program instructions that determine whether an impedance measurement of a fuel cell stack is requested during driving of a vehicle driven by power of the fuel cell stack;
   program instructions that turn off a first relay connected between the fuel cell stack and a battery charged by the fuel cell stack when the impedance measurement of the fuel cell stack is requested;
   program instructions that connect a stack load to the fuel cell stack via a second relay and supplying air to the fuel cell stack; and
   program instructions that measure the impedance of the fuel cell stack.

* * * * *